UNITED STATES PATENT OFFICE 2,537,366

PROCESS OF PRODUCING AMINOBENZOYL AMINO ACIDS

John Halley Mowat, Orangeburg, and Coy Webster Waller, Pearl River, N. Y., assignors to American Cyanamid Company, New York, N. Y., a corporation of Maine No Drawing. Application December 31, 1948, Serial No. 68,741

8 Claims. (Cl. 260—518)

This invention relates to an improved method of preparing aminobenzoyl amino acids. More particularly, it relates to the preparation of aminobenzoyl amino acids from the corresponding nitrobenzoyl amino acids by reduction.

In our copending application, Serial No. 771,570, filed August 30, 1947, of which this is a continuation-in-part, we disclosed certain glutamic acid amides of para-nitrobenzoic acid, especially those having a polypeptide linkage, such as para-nitrobenzoylglutamylglutamylglutamic acid which could be reduced to form the corresponding amino derivative.

As disclosed in our above named copending application, the reaction products of para-aminobenzoylpolyglutamic acids with 2,4,5-triamino-6-hydroxypyrimidine, and alpha, beta-dibromopropionaldehyde are growth stimulating factors for bacteria and higher forms of animal life and effect the formation of haemoglobin. These aminobenzoyl polypeptides are important intermediates and it is desirable to have convenient methods of preparing them in good yields.

In the past it is known to reduce nitro aliphatic compounds to the corresponding amino aliphatic compounds using metals such as zinc, tin or iron and a mineral acid. Often these strong acids are deleterious to sensitive compounds such as amino acids. When using dilute or weak acids the reduction is not complete and yields of the desired compound are low.

We have now found that nitrobenzoyl amino acids can be reduced to the corresponding aminobenzoyl amino acid by use of a zinc-copper couple which produces high yields of pure products in a relatively short time. The general reaction which takes place may be illustrated by the following equation:

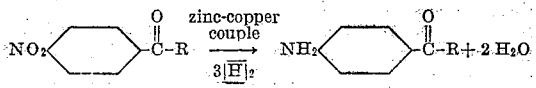

in which R is an amino acid radical or peptide thereof. The amino acids, obviously, may have present ester groups since neither the acid groups or the esters thereof take part in the present reaction.

The compounds which can be used as intermediates in the present invention are practically any nitrobenzoylamino acids or amides and esters thereof. The preferred intermediates are the polypeptides of glutamic acid such as para-aminobenzoylglutamylglutamic acid, para-aminobenzoyldiglutamylglutamic acid and esters thereof.

The zinc-copper couple used in the reaction of the present invention can be prepared by mixing an aqueous slurry of finely divided zinc with a water soluble salt of copper such as cupric acetate or cupric sulfate. The copper is plated on the zinc particles and produces a reducing agent which is used as the prepared slurry or as the dried powder in the reduction of nitrobenzoylamino acids to the corresponding aminobenzoylamino acids.

The reaction is carried out in acid medium at a pH of about 1 to about 4.5, and preferably at a pH of about 2.5 to 4.0. The reaction is carried out in a substantially aqueous solvent which may have present in addition to water, water miscible solvents such as lower aliphatic alcohols, acetone, cellosolve and the like.

The reaction can be carried out at temperatures of from about 15° C. to about 75° C., although we prefer to carry out the reaction at from about 20° C. to 50° C.

The following examples illustrate in detail the application of the invention to the preparation of representative aminobenzoylamino acids.

Example 1

To 31 g. of cupric acetate dissolved in about 200 ml. of water is added rapidly a suspension of 310 g. zinc dust suspended in about 500 ml. of water, with vigorous stirring. The zinc-copper couple is filtered off, washed with water, alcohol and ether and dried.

To 147 g. of moist gamma-ethyl p-nitrobenzoyl-gamma-glutamyl-gamma-glutamylglutamate having 86.2% solid matter (126.7 g. of dried material) suspended in 1500 ml. of water and adjusted to a pH of 3.5 is added 60 g. of zinc-copper couple, prepared above, over period of 23 minutes. The pH is held constant. The temperature rises to 49° C. The suspension is stirred for 67 minutes more and the excess zinc-copper filtered off. A Bratton Marshall amine assay gives 100.3% conversion of nitro compound to amine compound.

Example 2

Gamma-ethyl-p-nitrobenzoyl-gamma-glutamyl-gamma-glutamylglutamate as a partial dried cake representing 6.25 kg. of dry material is suspended in 43 liters of water. This suspension is adjusted to pH 3.5 and maintained at this pH by adding hydrochloric acid while the nitro group is reduced. Chopped ice is added as needed to keep the temperature at 30° C. The nitro group is reduced by adding a suspension of zinc-copper dust in 23.5 liters of water fairly rapidly. (The zinc-copper dust suspension is prepared by adding all at once a solution of 350 g. of copper acetate in 3.5 liters of water to a suspension of 3.5 kg. of zinc dust in 10 liters of water.) Ten liters of water was used in completing the transfer of the zinc-copper dust. A Bratton Marshall amine determination indicated 93.5% reduction of the nitro to an amine group.

Example 3

To 99 g. of para-nitrobenzoyl-alpha, alpha-diglutamylglutamic acid tetra-ethyl ester in a solution of 400 ml. of glacial acetic acid and 600 ml. of water, at a temperature of about 33° C., is added a portion of zinc-copper dust. The zinc-copper dust seemed to conglomorate and therefore the temperature was raised to 40° C. To the mixture is added 250 ml. of ethanol and the temperature raised to 45° C. A further portion of zinc-copper dust making a total of 68 g. is added to the mixture. The mixture is stirred ten minutes longer and filtered. The filtrate is diluted to 2500 ml. with water, cooled and filtered. The precipitate is dissolved in 750 ml. of ethanol and 750 ml. of water added. The mixture was cooled and filtered. The precipitate is recrystallized several times from ethanol and finally added to a solution of 1000 ml. of water and 100 ml. of acetic acid heated to 90° C. This solution is filtered hot. Upon cooling an almost white precipitate of para-aminobenzoyl-alpha, alpha-diglutamylglutamic acid tetraethyl ester is obtained. The product melted at 148° C. On analysis the product checked closely with the theoretical values.

Example 4

A zinc-copper couple is prepared by slurring 16.3 parts finely powdered zinc in 50 volumes of water, slowly adding 1.92 parts $CuSO_4.5H_2O$ dissolved in 10 volumes of water, and stirring vigorously for 10 minutes until all of the copper is plated out on the zinc.

Diethyl p-nitrobenzoylaminomalonate (16.2 parts) is added to 250 volumes of 1 N sodium hydroxide and stirred vigorously for 2½ hours at 25 to 30° C.; at the end of this time a complete solution is obtained, indicating complete hydrolysis of the ester to p-nitrobenzoylaminomalonic acid. To this solution is then added 30 volumes of 5 N hydrochloric acid, which gives a faint spot on Congo red test paper. While maintaining the temperature at 30° to 35° C. by means of external cooling, the zinc-copper couple as a slurry is added slowly to the solution of p-nitrobenzoylaminomalonic acid over a 15 minute period; sufficient concentrated (36%) hydrochloric acid is added to maintain a black spot on Congo red test paper. After completion of the addition of the zinc-copper couple, stirring at 30 to 35° C. is continued 20 minutes longer. More concentrated hydrochloric acid is added to maintain the black spot on Congo red test paper; total usage of concentrated hydrochloric acid is 44 volumes. Then 90 volumes of concentrated (28%) ammonia is added to give a strong spot on phenolphthalein test paper; this quantity of ammonia dissolved everything but the unreacted zinc. The solution is filtered and the zinc washed with water; 2 parts of zinc is recovered. The deep yellow reduction filtrate is 590 volumes. Titration of a sample of this filtrate with N/10 sodium nitrite solution showed that the reduction is 98% complete, calculated as p-aminobenzoylmalonic acid present.

Example 5

While maintaining the temperature at 30° to 35° C. a zinc-copper slurry (prepared as in the preceding example) is added slowly over a 15 minute period to a slurry of 12.7 parts p-nitrobenzoyl-dl-serine in 250 volumes of water; sufficient concentrated (36%) hydrochloric acid is added to maintain a black spot on Congo red test paper. Stirring at 30–35° C. is continued for 20 minutes after all of the zinc-copper slurry is added; more concentrated (36%) hydrochloric acid is added to maintain the black spot on Congo red test paper. Then the unreacted zinc is filtered off, the cake is washed well with water, and discarded. The light yellow filtrate was 500 volumes. Titration of a small aliquot of the filtrate with N/10 sodium nitrite solution shows that the reduction is 98% complete, calculated as p-aminobenzoyl-dl-serine present.

Example 6

20 parts of gamma-ethyl-para-nitrobenzoyl-gamma-glutamylglutamate was suspended in 190 cc. of water and 20 cc. of ethanol and reduced with a zinc-copper couple containing 17 parts of zinc and ½ part of copper. Hydrochloric acid is used to maintain the pH of 3.5. After allowing the reaction to proceed for about one hour, the excess zinc is filtered off, ammonium hydroxide added until the filtrate is distinctly alkaline and hydrogen sulfide passed in for 30 to 40 minutes. The zinc sulfide is filtered off, and the filtrate brought to pH 3 and evaporated to dryness using a high vacuum pump and a dry ice trap. Ethanol is added and evaporated again. The solid is taken up in about 80 cc. of absolute ethanol, filtered to remove the ammonium chloride filtrate, evaporated to dryness to give 17.4 g. of a flaky solid. A Bratton-Marshall amine test showed this to be 88% pure. This represents an 84% yield of gamma-ethyl-para-aminobenzoyl-gamma-glutamylglutamic acid.

Example 7

A zinc-copper couple is made by adding a solution of 0.33 g. of copper acetate in 3.3 ml. of water to a suspension of 3.27 g. of zinc dust in 9.31 ml. of water. The gamma-ethyl, p-nitrobenzoylglutamate (3.23 g.) is suspended in 67 ml. of water and sodium hydroxide is added to effect solution. Then concentrated hydrochloric acid is used to bring the pH to 3.5. A fine suspension appears throughout the solution. The zinc-copper suspension and hydrochloric acid are added alternately at such a rate that the pH remained at 3.5 and the temperature of the mixture did not go above 35° C. After the addition of the zinc-copper, the whole is stirred for an additional 45 minutes or until no more hydrochloric acid is necessary for maintaining the pH. The excess zinc-copper is filtered off and the clear solution is subjected to a Bratton-Marshall amine assay. A yield of 100% of gamma-ethyl, p-aminobenzoylglutamate is obtained.

Example 8

50 g. of para-nitrobenzoylglutamic acid of 93.1% purity is slurried in 750 cc. of water, heated to 68° C. and a solution containing 0.5 g. of cuprous chloride in 25 g. of water is added. 45 g. of zinc dust is added while the solution is well stirred. Then concentrated hydrochloric acid is carefully added to an acid reaction when tested on Congo red paper. When a clear solution is obtained, the unreacted zinc is separated by filtration and the filter cake is well washed with hot water. The aqueous filtrate is adjusted to 25° C. and solid sodium bicarbonate is slowly added until the solution is just alkaline to methyl red indicator paper. The temperature is lowered to 10° C. and the precipitated material is filtered. When dry, 37.8 g. of para-aminobenzoylglutamic acid is obtained. The mother liquor filtrate contains 6.6 g. of para-aminobenzoylglutamic acid as determined by titration with nitrite.

*Example 9*

Para-nitrobenzoyl-beta-alanine is reduced with zinc-copper couple by the procedure of Example 2 in aqueous solution using a pH of 3.0. The para-aminobenzoyl-beta-alanine obtained has a melting point of 148° C. to 149° C.

*Example 10*

The tetraethyl ester of para-nitrobenzoyl-alpha-glutamyl-gamma-glutamylglutamic acid is reduced with zinc-copper couple at a pH of 4 in a solution of 50% ethanol. The product obtained has a melting point of 117° C.

*Example 11*

Following the procedure of Example 2, the following compounds were reduced with zinc-copper couple at a pH of 3–4 in water or aqueous ethanol; para - nitrobenzoyl - gamma - glutamyl - alpha - glutamylglutamic acid tetraethyl ester; gamma-ethyl-para-nitrobenzoyl glutamate; para-nitrobenzoyl glutamic acid diamide; para-nitrobenzoyl glutamic acid gamma amide; para-nitrobenzoyl-alpha-gamma-glutamyldiglutamic acid; para - nitrobenzoyl - alpha - gamma - glutamyl - diglutamate tetraethyl ester; para-nitrobenzoyl-alpha - glutamyl - gamma - glutamylglutamic acid tetraethyl ester; para-nitrobenzoyl-gamma-glutamyl leucine; ethyl-para-nitrobenzoyl-gamma-glutamyl glycinate; para-nitrobenzoyl-gamma-glutamyl-beta-alanine; para-nitrobenzoyl aspartic acid; para-nitrobenzoyl-alpha-glutamyl-glutamic acid; para-nitrobenzoyl-alpha-alanine and para-nitrobenzoyl-dl-threonine. The yields of the corresponding para-aminobenzoyl derivatives were from 80% to 100% of the theoretical value.

It will be understood that various modifications may be made in the specific procedures described without departing from the scope of the invention.

We claim:

1. A method of preparing a member of the group consisting of aminobenzoylamino acids, amides and esters thereof which comprises reacting the corresponding nitrobenzoyl compounds with zinc-copper couple at a pH of about 1 to about 4.5 in the presence of a solvent.

2. A method of preparing aminobenzoylpolyglutamic acid esters which comprises reacting the corresponding nitrobenzoyl compounds with zinc-copper couple at a pH of about 1 to about 4.5 in the presence of a solvent.

3. A method of preparing para-aminobenzoyl-polyglutamic acid esters which comprises reacting the corresponding para-nitrobenzoyl compounds with zinc-copper couple at a pH of about 1 to about 4.5 in the presence of a solvent.

4. A method of preparing aminobenzoyltriglutamic acid esters which comprises reacting the corresponding nitrobenzoyl compounds with zinc-copper couple at a pH of about 1 to about 4.5 in the presence of a solvent.

5. A method of preparing gamma-ethyl-para-aminobenzoyl gamma-glutamyl-gamma-glutamylglutamate which comprises reacting the corresponding gamma-ethyl-para-nitrobenzoyl compound with zinc-copper couple at a pH of about 2.5 to about 4.0 in the presence of a substantially aqueous solvent.

6. A method of preparing gamma-ethyl-para-aminobenzoyl-gamma-glutamylglutamate which comprises reacting the corresponding gamma-ethyl-para-nitrobenzoyl compound with zinc-copper couple at a pH of about 2.5 to about 4.0 in the presence of a substantially aqueous solvent.

7. A method of preparing gamma-ethyl-para-aminobenzoyl-glutamate which comprises reacting the corresponding gamma-ethyl-nitrobenzoyl compound with zinc-copper couple at a pH of about 2.5 to about 4.0 in the presence of a substantially aqueous solvent.

8. A method of preparing para-aminobenzoyl-glutamic acid which comprises reacting the corresponding para-nitrobenzoylglutamic acid with zinc-copper couple at a pH of about 2.5 to about 4.0 in the presence of a substantially aqueous solvent.

JOHN HALLEY MOWAT.
COY WEBSTER WALLER.

REFERENCES CITED

The following references are of record in the file of this patent:

UNITED STATES PATENTS

| Number | Name | Date |
|---|---|---|
| 19,202 | Ellis | 1900 |
| 1,492,665 | Beall | May 6, 1924 |

OTHER REFERENCES

Meyer, Beilstein, Handbuch der Org. Chem., 4th ed., vol. 14, p. 358 (1931).

Houben, Die Methoden der Org. Chem. (3d ed.), vol. 2, p. 304 (1943).

Wagner-Jauregg et al., Chem. Abstracts, vol. 41, pp. 2118–2119 (1947).

Mowat et al., J. Am. Chem. Soc., vol. 70, pp. 1096–1102 (1948).